United States Patent [19]

Ek et al.

[11] Patent Number: 5,587,640
[45] Date of Patent: Dec. 24, 1996

[54] DELAYED SAFETY BRAKING APPARATUS FOR A SERVOMOTOR CONTROL SYSTEM

[75] Inventors: Anders Ek, Chicago; Johan Hegardt, Buffalo Grove, both of Ill.

[73] Assignee: Tetra Laval Holdings & Finance S.A., Pully, Switzerland

[21] Appl. No.: 315,407

[22] Filed: Sep. 28, 1994

[51] Int. Cl.$^6$ ........................................ G05B 1/06
[52] U.S. Cl. .................... 318/638; 318/678; 318/364
[58] Field of Search ........................... 318/366, 614, 318/665, 663, 626, 673, 6, 367, 369, 362, 368, 638, 671, 672, 677, 678, 681, 364, 365–366; 361/238

[56] References Cited

U.S. PATENT DOCUMENTS

| | | | |
|---|---|---|---|
| 4,035,705 | 7/1977 | Miller | 318/564 |
| 4,065,074 | 12/1977 | Anderson et al. | 318/6 |
| 4,250,440 | 2/1981 | Lee | 318/614 |
| 4,419,973 | 12/1983 | Collonia | 180/271 |
| 4,494,199 | 1/1985 | Lehmann | 361/238 |

Primary Examiner—John W. Cabeca
Attorney, Agent, or Firm—McAndrews, Held & Malloy, Ltd.; Patrick N. Burkhart

[57] ABSTRACT

A servomotor control system is set forth that assists in overcoming the problem of servomotor shut down during a failure of the programmable control system and/or servo-amplifier. The presently disclosed servomotor control system includes a programmable control system having one or more output signals connected to control a servo-amplifier. The system further includes a servomotor that is connected for control by the servo-amplifier. A safety switch is connected for detection by the programmable control system, the programmable control system controlling the servo-amplifier to brake the servomotor upon detection of the actuation of the safety switch. A delayed braking apparatus is disposed between the servo-amplifier and the servomotor. The delayed braking mechanism is also connected to detect the actuation of the safety switch, and acts to brake the servomotor after a predetermined time period from the detection of such actuation has lapsed.

15 Claims, 6 Drawing Sheets

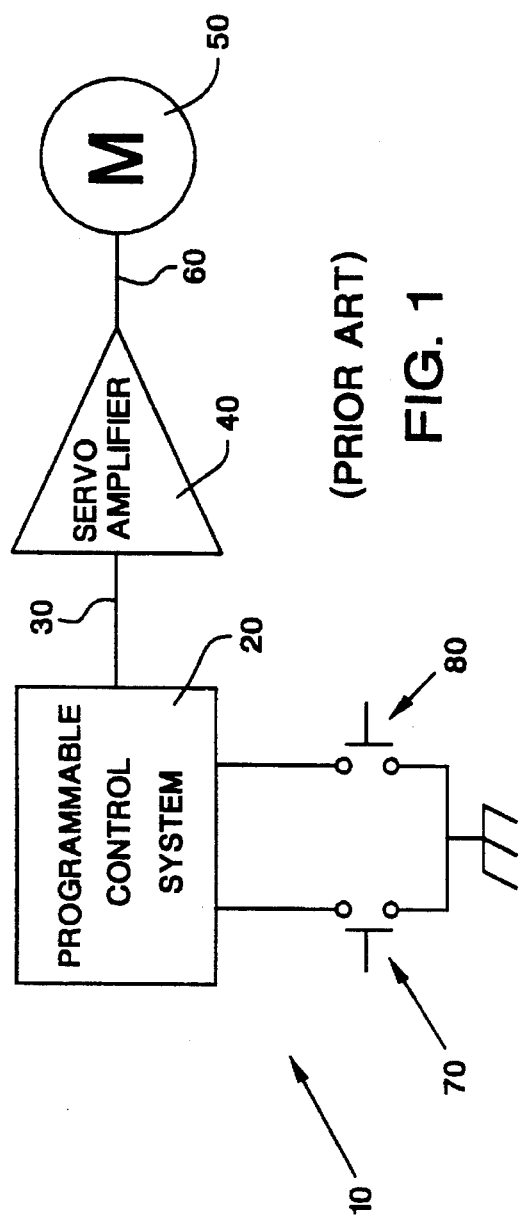
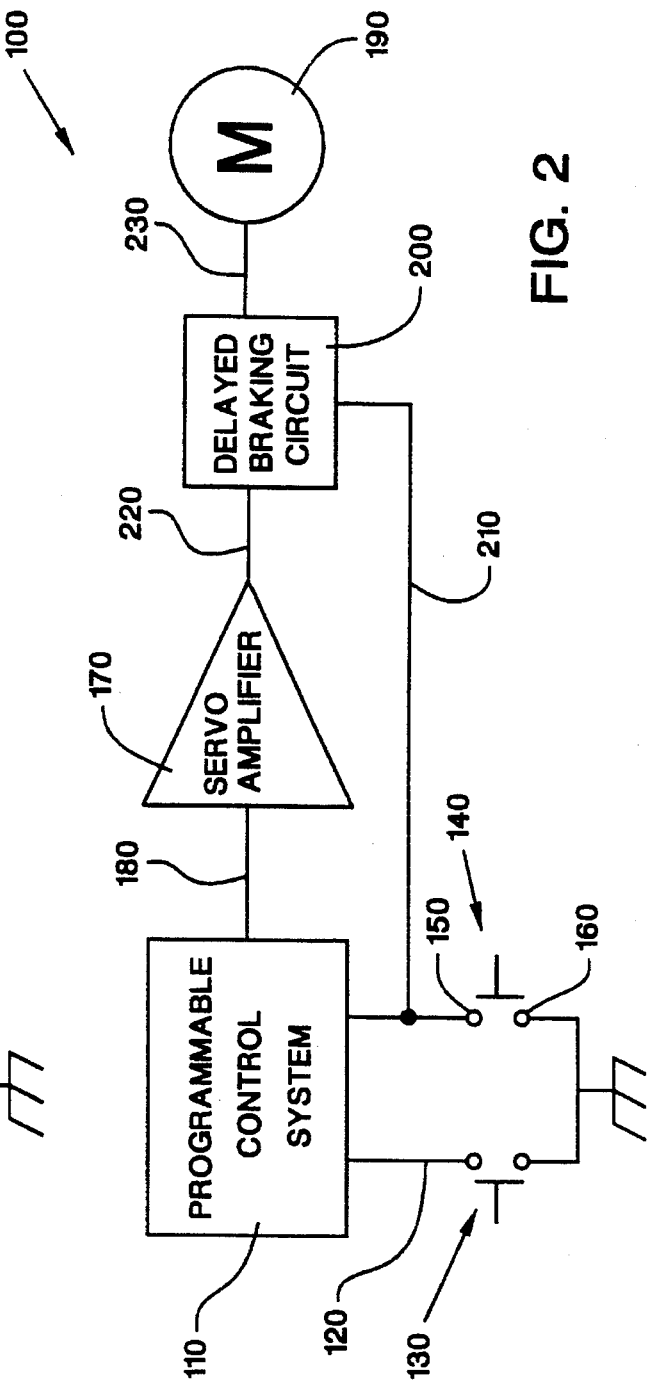

DELAYED SAFETY BRAKING APPARATUS FOR A SERVOMOTOR CONTROL SYSTEM

TECHNICAL FIELD

The present invention relates to a servomotor control system. More specifically, the present invention relates to a delayed safety braking circuit for a servomotor control system.

BACKGROUND

Servo-control systems are known and used throughout a number of industries where accurate, motor-controlled movement is required. One such servo-control system is illustrated in FIG. 1.

As illustrated, the servo-control system, shown generally at 10, includes a programmable control system 20 having an output along one or more lines 30 to control a servo-amplifier 40. The servo-amplifier 40, in turn, is connected to control a servomotor 50 along one or more lines 60. Execution of a predetermined motion profile that is stored in the programmable control system 20 may be initiated by start switch 70. Upon detection of a depression of the start switch 70, the programmable control system 20 sends the necessary control signals along lines 30 to the servo-amplifier 40 which drives the servomotor 50 in accordance with the received control signals to implement the motion profile.

As the motion profile is being executed, it may be necessary to stop the movement of the servomotor 50, for example, in an emergency, to prevent injury. Accordingly, an emergency stop switch 80 may be used to indicate to the programmable control system 20 that there is a need to stop the motion of the servomotor 50. Upon detection of the actuation of the emergency stop switch 80 by the programmable control system 10, the programmable control system 10 sends the appropriate commands to the servo-amplifier 40 to cease further motion of the servomotor 50.

One potential problem with the foregoing system is that it fails to recognize the potential for a failure of the programmable control system 20 or the servo-amplifier 40. More particularly, it is possible for the programmable control system 20 to fail to detect the actuation of the emergency stop switch 80 and/or fail to send the appropriate braking signals to the servo-amplifier 40. Likewise, the servo-amplifier 40 may fail to properly receive and/or respond to the braking signals sent by the programmable control system 20 when the system 20 detects the actuation of the emergency stop switch 80. In either instance, the servomotor 50 may continue to operate in a situation in which operation must necessarily cease.

SUMMARY OF THE INVENTION

A servomotor control system is set forth that assists in overcoming the problem of servomotor shut down during a failure of the programmable control system and/or servo-amplifier. The presently disclosed servomotor control system includes a programmable control system having one or more output signals connected to control a servo-amplifier. The system further includes a servomotor that is connected for control by the servo-amplifier. A safety switch is connected for detection by the programmable control system, the programmable control system controlling the servo-amplifier to brake the servomotor upon detection of the actuation of the safety switch. A delayed braking apparatus is disposed between the servo-amplifier and the servomotor. The delayed braking mechanism is also connected to detect the actuation of the safety switch, and acts to brake the servomotor after a predetermined time period from the detection of such actuation has lapsed.

In accordance with one embodiment of the system, the predetermined time period is a time period that is in excess of the time period required by the programmable control system and the servo-amplifier to brake the servomotor under normal braking conditions. Such a predetermined time period may be implemented where the programmable control system and servo-amplifier have the ability to stop the servomotor in a time period that is less than the time required for the delayed braking mechanism to stop the servomotor and, further, where they can brake all of the various servomotors of the system in synchrony.

Other objects and advantages of the present invention will become apparent upon reference to the accompanying detailed description when taken in conjunction with the following drawings.

BRIEF DESCRIPTION OF THE DRAWINGS

FIG. 1 is a schematic block diagram of a known servomotor control system.

FIG. 2 is a schematic block diagram of a servomotor control system including a delayed braking circuit.

DETAILED DESCRIPTION OF THE PREFERRED EMBODIMENT

Figure 3:
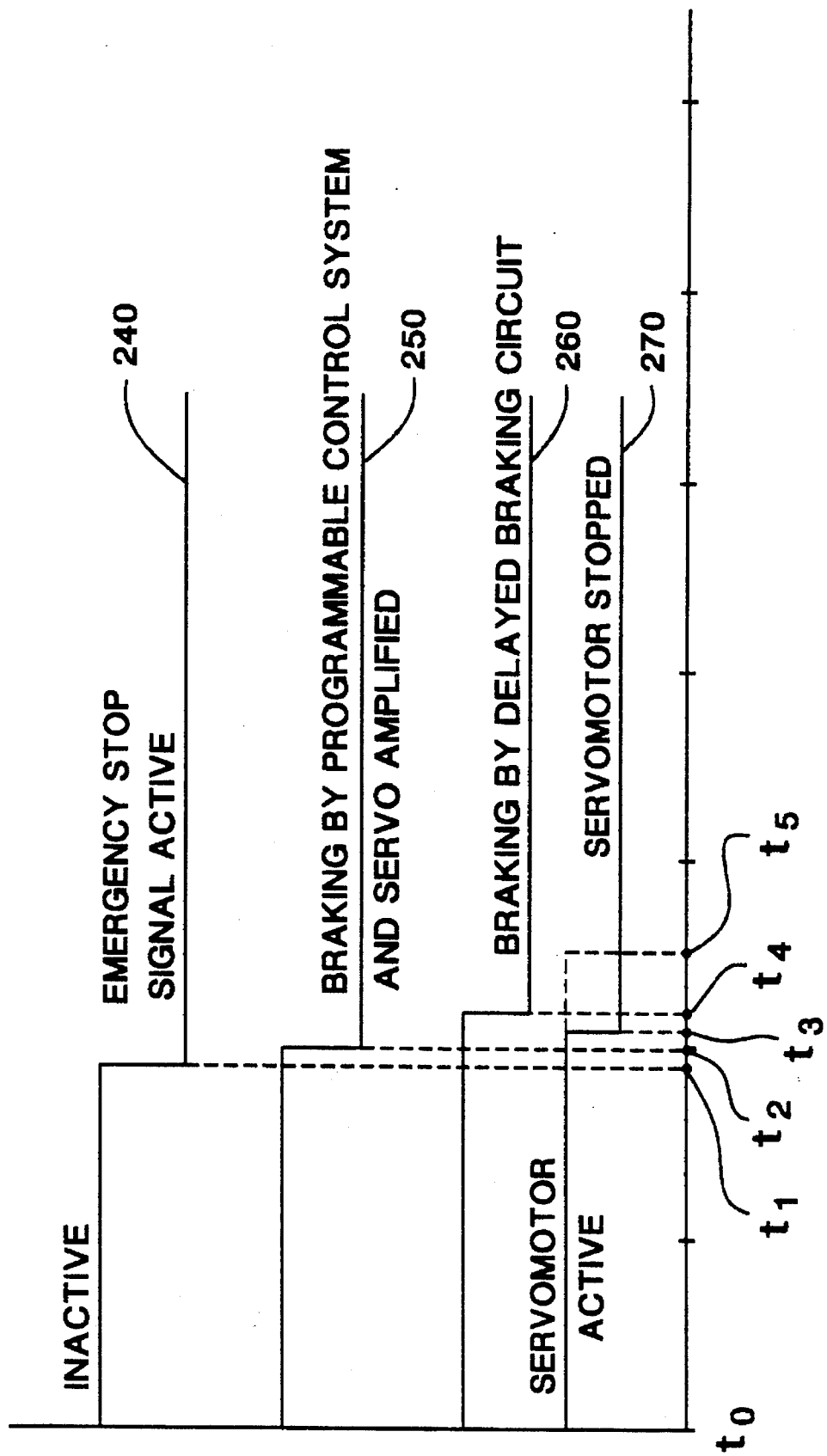
FIG. 3 is a timing diagram illustrating the operation of the servomotor control system of FIG. 2 wherein the predetermined time period is in excess of the time required by the programmable control system and servo-amplifier to brake the servomotor under normal braking conditions.

A servomotor control system, shown generally at 100, is illustrated in FIG. 2. As illustrated, the servomotor control system 100 includes a programmable control system 110. The programmable control system 110 is connected to receive a start signal input along one or more lines 120. The start signal may, for example, correspond to the actuation of a start switch 130 having a first terminal connected to the programmable control system 110 and a second terminal connected to, for example, chassis ground. The programmable control system 110 is also connected to receive an emergency stop signal that, for example, corresponds to the actuation of an emergency stop switch 110 having a first terminal 150 connected to the programmable control system 110 and a second terminal 160 connected to, for example, chassis ground.

As illustrated, the programmable control system 110 is connected to control a servo-amplifier 170 along one or more lines 180. The servo-amplifier 170, in turn, responds to command signals sent by the programmable control system 110 along the lines 180 and provides the necessary power to drive a servomotor 190 in accordance with the received commands.

A delayed braking circuit 200 is disposed between the servo-amplifier 170 and the servomotor 190. The delayed braking circuit 200 is further connected to receive the emergency stop signal along one or more lines 210, for example, from the emergency stop switch 140. One or more lines 220 connect the servo-amplifier to the delayed braking circuit 200 while one or more lines 230 connect the delayed braking circuit 200 to the servomotor 190.

FIG. 3 is a timing diagram illustrating one manner of operation of the servomotor control system of FIG. 2. In the illustrated diagram, line 240 illustrates the state of the emergency stop signal, line 250 illustrates the activation of a braking sequence by the programmable control system 110, line 260 illustrates the activation of a braking sequence by the delayed braking circuit 200, and line 270 illustrates the status of the servomotor 190.

During standard operation of the servomotor control system 100, illustrated here between time $t_0$ and $t_1$, the servomotor 190 is actively executing a motion profile in accordance with commands received by the servo-amplifier 170 from the programmable control system 110. No attempt is made by either the programmable control system 110 or the delayed braking circuit 200 to initiate a braking sequence that would stop the movement of the servomotor 190.

At time $t_1$, the emergency stop signal has been activated to signal the need to stop further movement of the servomotor 190. The emergency stop signal may, for example, be a signal that is latched at an active state upon depression of the emergency stop switch 140. Alternatively, or in addition, the emergency stop signal may be generated when, for example, a door of a packaging machine utilizing the servomotor control system 100 is opened thereby exposing bystanders to a risk of harm from further operation of the servomotor 190. Any number of switch and/or signal configurations may be used to generate the emergency stop signal, the foregoing configurations being exemplary.

Both the programmable control system 110 and the delayed braking circuit 200 are connected to receive the emergency stop signal 240, receipt of the signal occurring at time $t_1$. Under normal operation of the servomotor control system 100, the programmable control system 110 begins executing a braking sequence at time $t_2$ in an attempt to stop the servomotor 190. This braking sequence is effective as of time $t_3$, at which time the servomotor 190 has been stopped.

Under abnormal conditions of the servomotor control system 100, the programmable control system 110 and/or servo-amplifier 170 will fail to execute a normal braking sequence. A braking sequence is thus initiated by the delayed braking circuit 200 at time $t_4$. The braking sequence initiated by the delayed braking circuit 200 is effective as of time $t_5$, at which point the servomotor 190 has been stopped.

In the illustrated timing diagram, the time period between $t_2$ and $t_3$ is greater than the time period between $t_4$ and $t_5$. Such timing recognizes the fact that, in many instances, braking by the programmable control system 110 and servo-amplifier 170 is more time effective than could otherwise be achieved by braking the servomotor 190 with the delayed braking circuit 200 and, further, allows braking of multiple servomotors in synchrony. As such, the delayed braking circuit 200 initiates its braking sequence a predetermined time period, illustrated here as between $t_1$ and $t_4$, after detection of an active emergency stop signal. This delay period prevents the delayed braking circuit 200 from initiating its braking sequence until after the programmable control system 110 and servo-amplifier 170 have had sufficient time to brake the servomotor 190.

Figure 4:
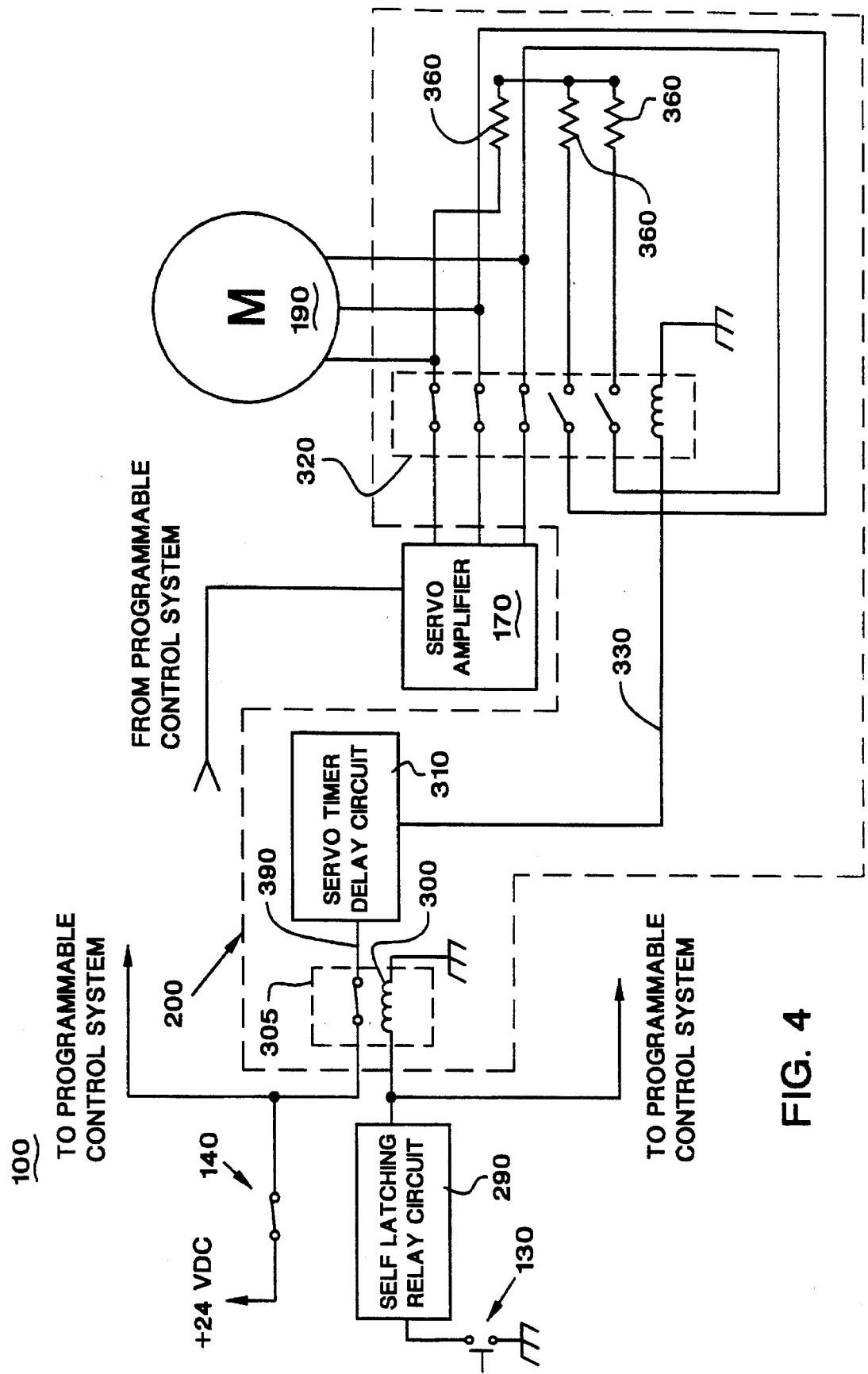
FIG. 4 is a schematic diagram of one embodiment of the servomotor control system illustrated in FIG. 2 during execution of a motion profile by the servomotor.

FIG. 4 illustrates one embodiment of the servomotor control mechanism 100 illustrated in FIG. 2. In this embodiment, the start switch 130 is connected to the input of a self-latching relay circuit 290 which, in turn, is connected to actuate the coil 300 of relay 305 and, further, is connected to the input of the programmable control system 110. The emergency stop switch 140 has a first terminal connected to a power source (shown here at +24 VDC) and a second terminal connected to the input of relay 305. The emergency stop switch 140 is shown in its inactive state while relay 305 is shown in its active state after being actuated by the start switch 130 and self-latching relay circuit 290. As such, the power (+24 VDC) at the first terminal of the emergency stop switch 130 is connected through the emergency stop switch 140 and relay 305 to the input of a servo timer delay circuit 310. The output of the servo timer delay circuit 310 is supplied for actuation of the coil of a servomotor relay 320 along line 330.

Relay 320 is shown in its activated state. In this activated state, servomotor relay 320 through-connects the outputs of servo-amplifier 170 to servomotor 190. Such through-connection allows the servomotor 190 to execute a motion profile under the control of the servo-amplifier 170 which, in turn, controls the motion profile in accordance with commands received from the programmable control system 110.

Figure 5:
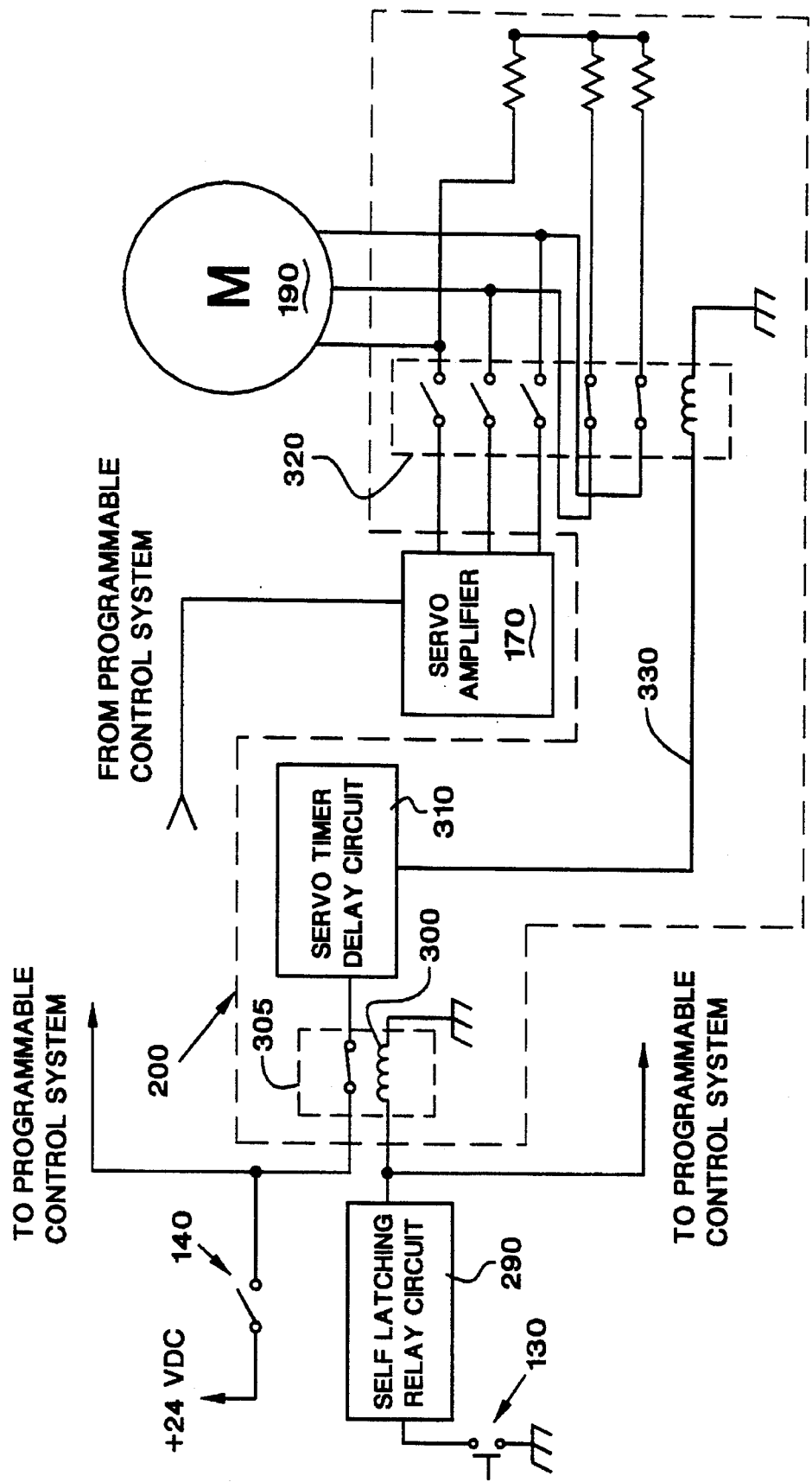
FIG. 5 is a schematic diagram of one embodiment of the servomotor control system illustrated in FIG. 2 wherein the delayed braking circuit has initiated a braking sequence to stop the movement of the servomotor.

FIG. 5 illustrates the servomotor control system 100 after actuation of the emergency stop switch 140. As illustrated, actuation of the emergency stop switch 140 disconnects the power at the first terminal of the emergency stop switch from the input of relay 305. The servo timer delay circuit 310 detects this actuation and, after a predetermined time period, drives servomotor relay 320 to an unactuated state. In its unactuated state, servomotor relay 320 disconnects the servo-amplifier 170 from the servomotor 190. An abrupt disconnection of the servomotor 190 may result in servomotor damage and/or allow the servomotor to continue operation for a time period after its disconnection. Accordingly, the inputs to the servomotor 190 are connected through servomotor relay 320 to a plurality of braking resistors 360. As will be readily recognized through an analysis of the foregoing circuit, the servo timer delay circuit 310 will also disconnect the servo-amplifier 170 from the servomotor 190 if the start switch 130 has not been actuated to supply power to the coil of relay 300.

Figure 6:
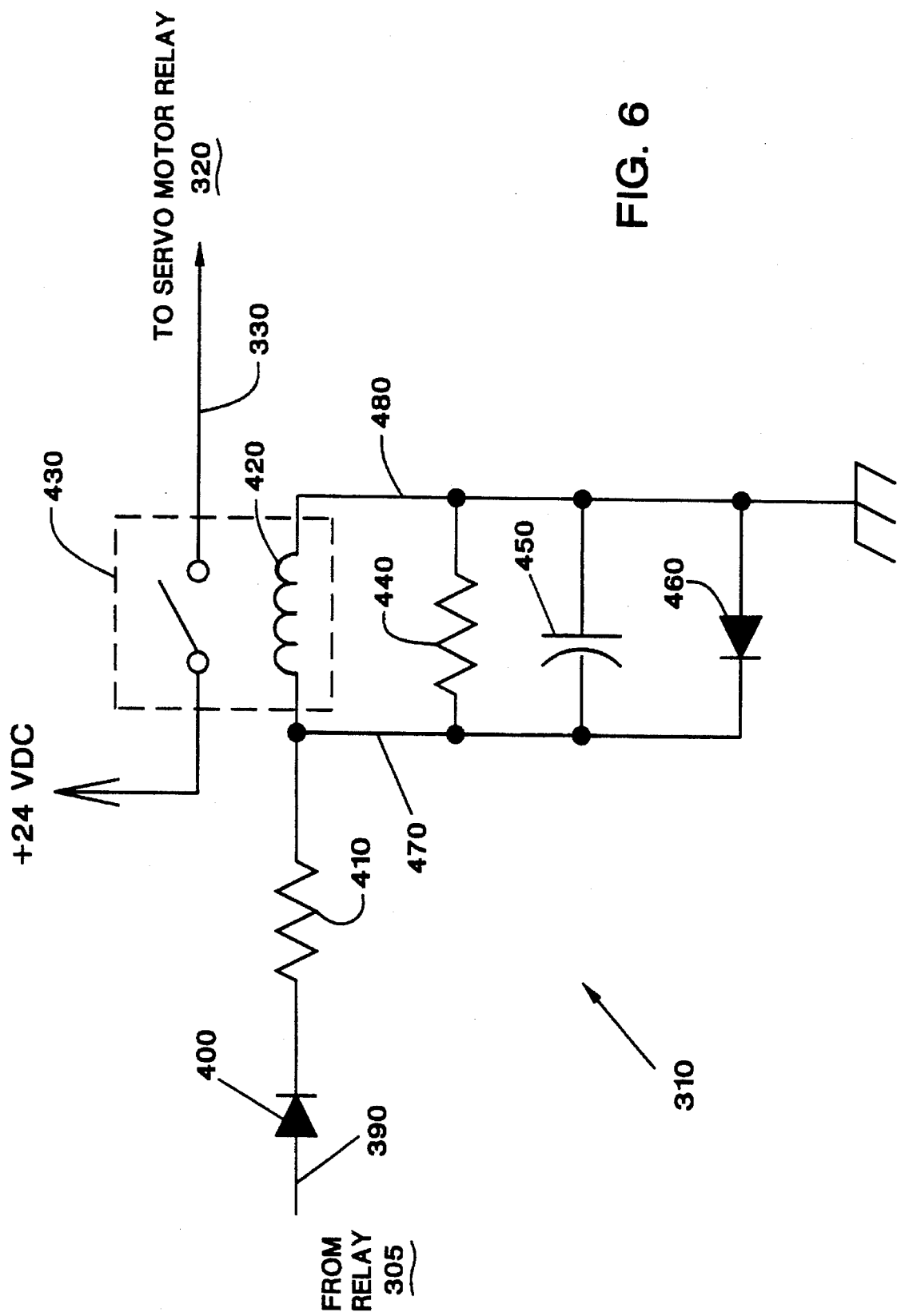
FIG. 6 is a schematic diagram of one embodiment of the servo-timer delay circuit of FIGS. 3 and 4.

FIG. 6 illustrates one embodiment of the servo timer delay circuit 310. As illustrated, the circuit 310 has an input connected to receive the output of relay 305 at line 390. The input signal is supplied through a series connected diode 400 and resistor 410 to the input of a coil 420 of a relay 430. A resistor 440, a capacitor 450, and diode 460, are connected in parallel with the coil 420 of relay 430 and function as an RC timer. A first side 470 of the parallel connection is connected to resistor 410 while a second side 480 of the parallel connection is connected to, for example, chassis ground. A first terminal of the relay 430 is connected to receive a voltage, for example, +24 VDC while a second terminal of the relay 430 is connected to the coil of the servomotor relay 320.

When the emergency stop switch 140 is in an unactuated state and relay 305 has been actuated, power is received at the input of the diode 400. Receipt of the power actuates the coil 420 of the relay 430 causing relay 430 to supply an actuating voltage along line 330 to the servomotor relay 320.

When emergency stop switch 140 is actuated, the input at diode 400 is allowed to float. At this point, the capacitor 450 of the parallel circuit maintains the coil 420 in an actuated state for the predetermined period of time after the predetermined time period has elapsed, however, capacitor 450 ultimately discharges to a level at which it is no longer capable of actuating coil 420. Once relay 430 goes to an unactuated state, the output 330 of relay 430 to the servomotor relay 320 is allowed to float thereby causing the servomotor relay 320 to go to its unactuated state in which the servo-amplifier 170 is disconnected from the servomotor 190, and servomotor 190 is connected to the brake resistors 360.

Figure 7:
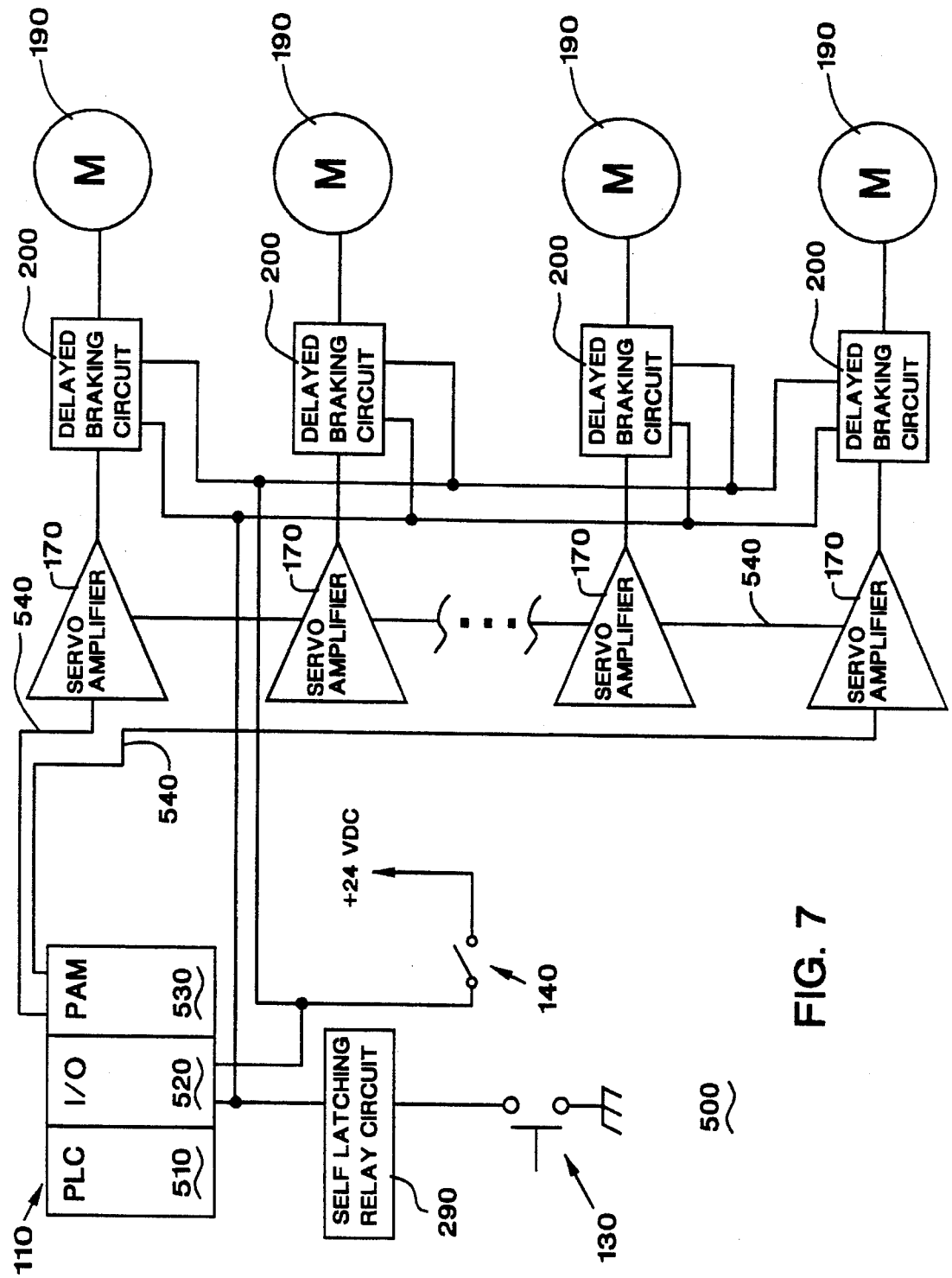
FIG. 7 is a schematic block diagram of a further embodiment of a servomotor control system wherein a plurality of servomotors are utilized.

FIG. 7 illustrates use of the delayed braking circuit 200 in a servomotor control system 500 employing a plurality of servo-amplifiers 170 and servomotors 190. In the illustrated embodiment, the programmable control system 110 includes a programmable logic controller (PLC) 510, an I/O interface 520 for use with the PLC 510. and a programmable axis manager (PAM) 530. The PLC 510, I/O interface 520, and PAM 530 may be connected for communication over a VME bus.

The programmable control system 110 may be implemented in accordance with the teachings of U.S. Ser. No. 08/385,414, entitled "Control System For A Packaging Machine," which is incorporated herein by reference. The PLC 510 may be a Model 9070 Programmable Logic Controller available from GE Fanuc while the PAM 530 may be a programmable axis manager available from Socapel.

The PAM 530 is connected to control the servo-amplifiers 170 over one or more lines 540 which, for example, may form an optical ring network. A delayed braking circuit 200 is disposed between each servo-amplifier 170 and its respective servomotor 190. Each of the delayed braking circuits 200 is connected to receive the output of the self-latching relay circuit 290 and the emergency stop switch 140. The servo-amplifiers 190 may be, for example, Model ST-1 servo-amplifiers available from Socapel.

In operation, actuation of the emergency stop switch 140 is detected by the PLC 510 through I/O interface 520. The PLC 510 then instructs the PAM 530 to brake the servomotors 190 via the servo-amplifiers 170. The PAM 530 sends the requisite braking signals to the servo-amplifiers over the optical ring network that, in turn, brake the servomotors 190. Alternatively, the emergency stop switch may be connected for detection by an I/O interface in one of the servo-amplifiers 170. Operation of the delayed braking circuit 200 proceeds in accordance with the previously described braking sequence.

Although the present invention has been described with reference to specific embodiments, those of skill in the art will recognize that changes may be made thereto without departing from the scope and spirit of the invention as set forth in the appended claims.

We claim as our invention:

1. A servomotor control system comprising:

a programmable control system;

a servo amplifier connected for control by the programmable control system;

a servomotor connected for control by the servo amplifier;

a safety switch connected for detection by the programmable control system, the programmable control system controlling the servo amplifier to perform primary braking of the servomotor upon detection of activation of the safety switch; and a delayed braking circuit disposed between the servo amplifier and the servomotor, the delayed braking circuit connected to detect activation of the safety switch, the delayed braking circuit acting to perform secondary braking of the servomotor to override control of the servomotor by the programmable control system and servo amplifier after a predetermined time period from detection of the activation of the saftey switch.

2. A servomotor control system as claimed in claim 1 wherein the predetermined time period is a time period that is in excess of the time period required by the programmable control system and the servo amplifier to brake the servomotor under normal braking conditions.

3. A servomotor control system as claimed in claim 1 wherein the programmable control system comprises:

a programmable axis manager connected to control the servomotor; and a programmable logic controller in communication with the programmable axis manager and connected to detect actuation of the safety switch.

4. A servomotor control system comprising:

a programmable control system;

a servo amplifier connected for control by the programmable control system to effect a predetermined motion profile;

a servomotor connected for control by the servo amplifier;

a safety switch connected for detection by the programmable control system, the programmable control system controlling the servo amplifier to brake the servomotor upon detection of activation of the safety switch; and a delayed braking circuit disposed between the servo amplifier and the servomotor, the delayed braking circuit connected to detect activation of the safety switch, the delayed braking circuit acting to brake the servomotor upon failure of the programmable control system and the servo amplifier to brake the servomotor within a predetermined period of time after actuation of the safety switch.

5. A servomotor control system as claimed in claim 4 wherein the predetermined time period is a time period that is in excess of the time period required by the programmable control system and the servo amplifier to brake the servomotor under normal braking conditions.

6. A braking circuit for use in braking a servomotor that is connected for control by a servo amplifier, the braking circuit comprising:

stop means for generating a stop signal having an active and an inactive state;

a primary brake circuit for controlling the servo amplifier to brake the servomotor when the stop signal goes to the active state;

at least one regenerative braking element;

a relay disposed between the servo amplifier and the servomotor for through-connecting signals from the servo amplifier to the servomotor when the relay is in a first state and for disconnecting the signals from the servo amplifier from the servomotor when the relay is in a second state, the relay connecting the servomotor to the at least one regenerative braking element when the relay is in the second state; and actuation means for actuating the relay in response to the stop signal of the stop means to remain in its first state when the stop signal is in its inactive state and for actuating the relay to go to its second state a predetermined period of time after the stop signal goes to the active state.

7. A braking circuit as claimed in claim 6 wherein the predetermined time period is a time period that is in excess of the time period required by the primary brake circuit to brake the servomotor under normal braking conditions.

8. A braking circuit as claimed in claim 6 wherein the stop means comprises an emergency stop switch.

9. A braking circuit as claimed in claim 6 wherein the stop means comprises a door open switch.

10. A braking circuit as claimed in claim 6 wherein the primary brake circuit comprises a programmable control system connected to control the servo amplifier.

11. A braking circuit as claimed in claim 10 wherein the programmable control system comprises:

a programmable axis manager connected to control the servomotor; and a programmable logic controller in communication with the programmable axis manager and connected to detect actuation of the safety switch, the programmable logic controller communicating a braking command to the programmable axis manager upon detection of the actuation of the safety switch.

12. A braking circuit as claimed in claim 6 wherein the stop means comprises a safety switch having a first terminal connected to a power source and a second terminal.

13. A braking circuit as claimed in claim 12 wherein the actuation means comprises a timer delay circuit having an input connected to receive a signal from the second terminal of the safety switch and an output connected to actuate the relay to go to the second state when the salary switch is in an open condition.

14. A braking circuit as claimed in claim 13 wherein the relay includes an actuating coil.

15. A braking circuit as claimed in claim 14 wherein the timer delay circuit comprises:

a further relay having an input connected to a power source and an output connected to the actuating coil of the first mentioned relay, the further relay having an actuating coil having a first terminal connected to receive the signal at the second terminal of the safety switch and a second terminal connected to ground potential; and an RC timer circuit connected in parallel with the actuating coil of the further relay.

\* \* \* \* \*

UNITED STATES PATENT AND TRADEMARK OFFICE
CERTIFICATE OF CORRECTION

PATENT NO. : 5,587,640
DATED : December 24, 1996
INVENTOR(S) : Anders Ek and Johan Hegradt It is certified that error appears in the above-indentified patent and that said Letters Patent is hereby corrected as shown below:

IN COLUMN 5, LINE 18

Please cancel "." and insert --,-- therefor.

IN COLUMN 8, LINE 6

Cancel "salary" and insert --safety-- therefor.

Signed and Sealed this

Twenty-ninth Day of April, 1997

Attest:

BRUCE LEHMAN

Attesting Officer     Commissioner of Patents and Trademarks